March 31, 1964 J. M. BROUWER 3,127,478
AUTOMATIC PRIVATE EXCHANGE WITH FACILITIES FOR BREAKING-IN AND CONFERENCE CALLS
Filed May 13, 1959
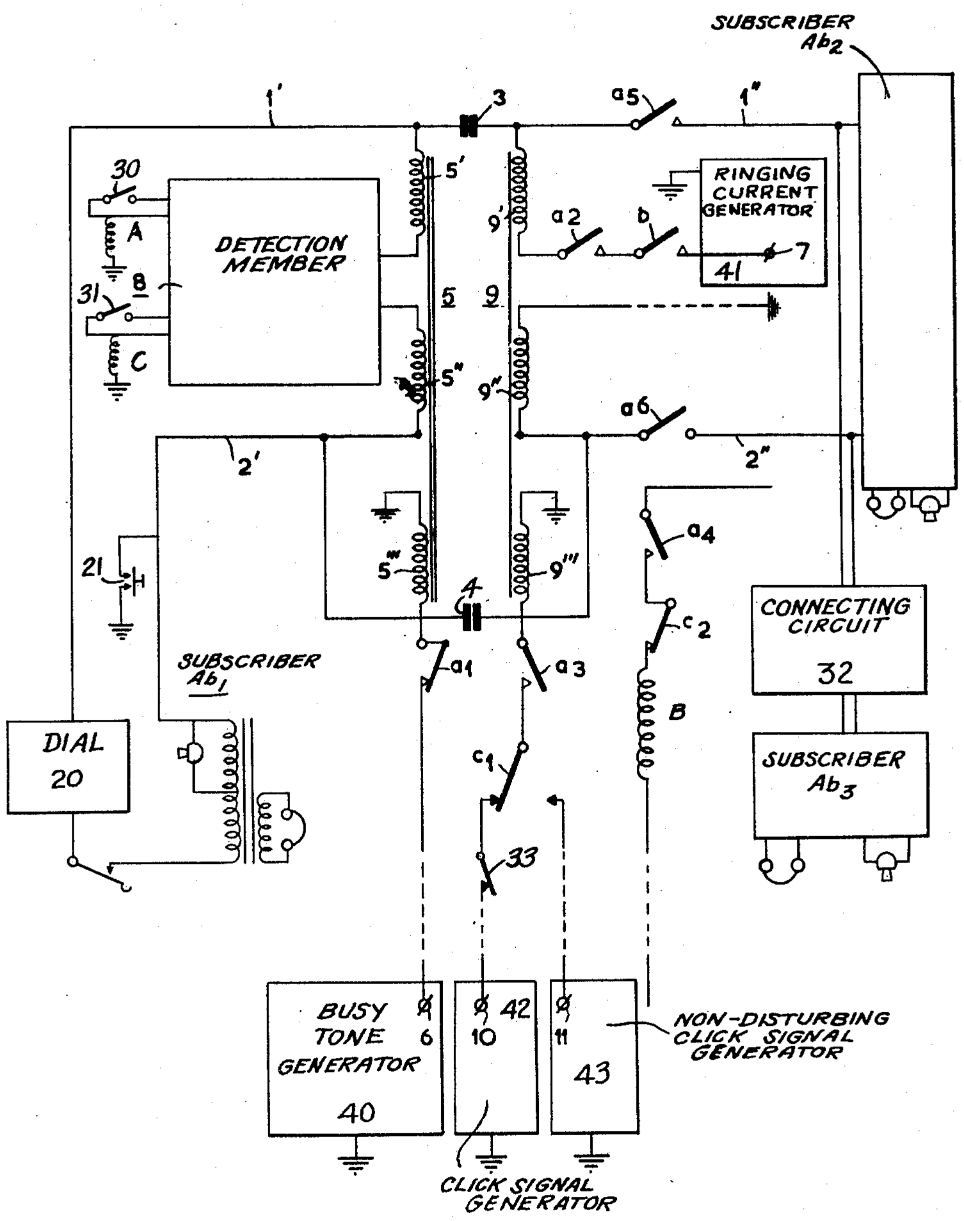
INVENTOR
JOHANNES MARTINUS BROUWER
BY
Frank R. Trifari
AGENT 3,127,478

AUTOMATIC PRIVATE EXCHANGE WITH FACILITIES FOR BREAKING IN AND CONFERENCE CALLS

Johannes Martinus Brouwer, Hilversum, Netherlands, assignor to North American Philips Company, Inc., New York, N.Y., a corporation of Delaware Filed May 13, 1959, Ser. No. 812,986
Claims priority, application Netherlands June 3, 1958
4 Claims. (Cl. 179—18)

The invention relates to an automatic private exchange with facilities for "breaking-in" and conference calls, in which the subscribers entitled to break in have access to special connecting circuits. The connecting circuits maintain a composed connection with a busy subscriber if the calling subscriber is entitled to break in, but interrupt the connection if the calling subscriber is not entitled to break in. Each of the connecting circuits includes a detection member to detect a break in signal emitted by a calling subscriber entitled to break in. The break-in signal indicates that the calling subscriber desires to break in. Provision is also made of means actuated by the detection member after the reception of a break-in signal in order to effect the breaking in, suppress the busy tone, switch on a click signal and prepare the energization of a recall relay. Existing private exchanges of this kind are provided with a conference connection which the subscribers entitled to conferences can energize. However, in order to obtain a conference the co-operation of the telephone operator is required. To establish a conference call, the sets of the subscribers entitled to conferences and in the operator's set must have means for controlling the call, and fairly extensive changes must be made in the exchange itself. The invention has for its object to obviate these disadvantages.

In accordance with the invention the detection member is constructed so that it is also capable of detecting a second signal emitted by the calling subscriber entitled to break in (conference signal). Upon the reception of the second signal the energizing circuit of the recall relay is interrupted, the click signal is reduced to a non-disturbing level (or completely suppressed), and the microphone of the called subscriber is prevented from being fed from the special connecting circuit concerned.

The breaking-in signal may comprise a pulse produced, for example, by dialling the digit 1 by means of the dial. The conference signal may be produced by depressing a ground connection button. This button is used for consulation and through-connection, for which purpose it is already provided. In this case no changes need be made in the subscriber's sets and only minor changes need be made in the special connecting circuits. Moreover, the conference may be held entirely without the co-operation of the operator, if a subscriber (who is not necessarily entitled to break in or to conferences) calls two or more subscribers entitled to break in, inviting them to make a recall and to perform the manipulations required for the establishment of a conference. These manipulations consist of dialling the digit 1 (to break in) and depressing the earth-connection button (to reduce the click signal to a non-disturbing level or so supress it completely, so that the recall circuit is disconnected and the microphone of the called subscriber is prevented from being fed from the special connecting circuit). These manipulations need, of course, not be carried out by the subscriber calling first, so that this subscriber need not be entitled to break in.

The invention does not depend upon the nature of the breaking-in and the conference signal. These signals may be constituted, for example, by the depression of two special buttons, so that two relays in the detection member are energized by way of two additional wires. The aforesaid solution in which the break-in signal is produced by means of the dial and the conference signal by means of the ground-connection button, is, however, simpler.

One embodiment of the invention will now be described more fully with reference to the drawing.

The drawing shows a circuit diagram of a special connecting circuit with facilities for breaking-in and conference calls. For the sake of clarity only the elements important for the invention are shown.

The connecting circuit shown in the drawing is connected on the left-hand, to a subscriber $Ab_1$, entitled to break-in and conference, and on the right hand to any further subscriber $Ab_2$. In the drawing 1', 1'' and 2', 2'' designate parts of the two speech conductors. The part 1' of the speech conductor is coupled via a capacitor 3 with the part 1'' of the speech conductor and in the same manner the part 2' of the speech conductor is connected via a capacitor 4 to the part 2'' of the speech conductor. The capacities of these capacitors must be sufficiently high to allow speech and tone signals to pass. The connecting circuit includes for normal telephone conversation, a supply transformer 5 having secondary windings 5' and 5'' and primary winding 5''' to supply the busy tone, the primary winding of this transformer being connected to a terminal 6 of a busy tone generator 40 by way of break contact $a_1$, to be described hereinafter. The connecting circuit includes, by way of a make contact $a_2$, and a make contact $b$, to be described hereinafter, a connection to a terminal 7 of a ringing current generator 41. Irrelevant relay windings or contacts, which may depend upon the structure of the further part of the exchange are indicated in the drawing by the dotted parts in the lines connected to the terminals 6 and 7.

In order to permit breaking in, the special connecting circuit includes a detection member 8 to detect the break-in signal, and a supply transformer 9 having secondary windings 9' and 9'' and primary winding 9''' to provide a click signal. The primary winding 9''' of this transformer is connected by way of a make contact $a_3$ and a change-over contact $c_1$, to be described hereinafter, to a terminal 10 of a click-signal generator 42. The special connecting circuit also includes a recall relay B. The energizing circuit of relay B includes a make contact $a_4$ and a break-contact $c_2$, to be described hereinafter. The detecting element of the detection member 8 comprises a relay A, which responds to the break-in signal. This signal as stated above may be a pulse produced by means of the dial 20 connected to line 1'. The relay A may be readily constructed so that it responds to such a pulse. The relay A must also have a holding contact 30 or a holding winding, so that once energized, it remains energized until the supply circuit of the relay is interrupted when the subscriber $Ab_1$ puts down the receiver. The relay A comprises, apart from the aforesaid break-contact $a_1$ and the aforesaid make-contacts $a_2$, $a_3$, $a_4$, a make contact $a_5$ included in the speech conductor 1'', and a make contact $a_6$ included in the speech conductor 2''. The recall relay B comprises the aforesaid make-contact $b$.

In order to permit the establishing of conferences, the detection member 8 comprises a conference signal detecting element, which responds to the conference signal. This signal, as stated above, may be produced by a transient connection to ground of the speech conductors by a transient depression of a ground connection button 21 connected to line 2'. The conference signal detecting element may be, for example, a relay C energized by this ground-connection. This relay also has a holding winding or a holding contact 31, so that, once energized, it remains energized until the supply circuit of the relay is interrupted, when the subscriber $Ab_1$ puts down his microphone. The relay C comprises the aforesaid change-over contact $c_1$ and the aforesaid break-contact $c_2$. By changing over the change-over contact $c_1$ the primary winding 9''' of the supply transformer 9 for the click signal is connected to a terminal 11 of a second click-signal generator 43, which supplies a non-disturbing click-signal. This is intended to remind the conference subscribers of the fact that they are having a conference and are, therefore not having a normal telephone conversation. This second click signal may be, for example, a much slower click signal.

The circuit of the invention operates as follows; It is assumed that the subscriber $Ab_1$ calls the subscriber $Ab_2$, and that subscriber $Ab_2$ is busy. In this case subscriber $Ab_1$ is informed of the busy state of subscriber $Ab_2$ since a busy tone is received by subscriber $Ab_1$. This tone is produced, since the primary winding 5''' of the supply transformer 5 is connected by way of the closed break-contact $a_1$ to the busy-tone generator 40. When subscriber $Ab_1$ then produces the break-in signal, relay A responds. Thus the contact $a_1$ opens and the contacts $a_2$, $a_3$, $a_4$, $a_5$, $a_6$ close. Owing to the closure of the contacts $a_5$ and $a_6$, the subscriber $Ab_1$ enters the connection of $Ab_2$ with, for example, the subscriber $Ab_3$, which means that there is a breaking-in. When contact $a_1$ opens, the busy tone vanishes, but when contact $a_3$ closes, this signal is replaced by the click signal, since the primary winding 9''' of the supply transformer 9, in order to produce the click signal, is connected by way of the closed make-contact $a_3$ and the change-over contact $c_1$ in the rest position, to the terminal 10 of the disturbing click-signal generator 42. Owing to the closure of contact $a_4$ the energizing circuit of the recall relay B is prepared (since contact $c_2$ is closed). This relay responds as soon as the called subscriber lays down his receiver, since then the relay is energized via contact $a_4$, and contact $c_2$. Owing to the closure of contact $a_2$, the connection of the part of the connecting circuit connected to the subscriber $Ab_2$ to the terminal 7 of the ringing current generator 41 is prepared.

When the subscriber $Ab_3$ then lays down his microphone, the connection of the subscriber $Ab_2$ with the subscriber $Ab_3$ by means of connecting circuit 32 is interrupted, but the connection of the subscriber $Ab_1$ with the subscriber $Ab_2$ is not interrupted. At the same time the laying down of the microphone by subscriber $Ab_2$ causes the relay B to be energized, so that contact $b$ closes and the subscriber $Ab_2$ is recalled. Since the connection of subscriber $Ab_2$ with the subscriber $Ab_3$ is interrupted, the subscriber $Ab_3$ is not recalled. When the subscriber $Ab_2$ then lifts his receiver, he may converse with the subscriber $Ab_1$ without the subscriber $Ab_3$ listening in. At the same time the click signal vanishes, for example, since a contact 33 in the circuit of the primary winding 9''' of the supply transformer 9 opens.

It will now be assumed that the subscribers $Ab_2$ and $Ab_3$ do not lay down their microphones and that the subscriber $Ab_1$ emits the conference signal. In this case the relay B does not respond, but the relay C is energized, so that from that instant the relays A and C are both energized. Owing to the energization of relay C, the change-over contact $c_1$ is changed over, so that the primary winding 9''' of the supply transformer 9 is no longer connected to the terminal 10 of the disturbing click-signal generator 42 but to the terminal 11 of the non-disturbing click-signal generator 43. The disturbing click-signal is thus replaced by the non-disturbing signal. Contact $c_1$ may, of course, also be a break-contact, in which case the click signal vanishes completely when the conference signal is emitted. Owing to the response of relay C, contact $c_2$ is also opened so that the energization of relay B is rendered impossible. Thus contact $b$ cannot close and the subscribers $Ab_2$ and $Ab_3$ cannot obtain ringing current to their microphones from the special connecting circuit, and no recall can take place. A conference is then possible between the subscribers $Ab_1$, $Ab_2$ and $Ab_3$.

If a subscriber who is entitled to establish a break-in and a conference lays down his microphone, the relay A concerned is deenergized, for example because the supply circuit of this relay includes a make-contact of the supply relay of the connecting circuit concerned. Owing to the deenergization of relay A, relay C is deenergized, for example, since its supply circuit includes a make-contact of relay A.

What is claimed is:

1. An automatic private exchange comprising a plurality of subscribers' lines, a connecting circuit for interconnecting said lines, a source of a break-in signal connected to at least one of said lines, and a source of a conference signal connected to said one line, said connecting circuit comprising first detector means responsive to said break-in signal for establishing a connection with a busy called subscriber and indicating to said busy called subscriber that a break in connection has been made, second detector means responsive to said conference signal for removing indication of a break-in and inhibiting recall of said called subscriber, a source of busy signals for indicating to said one line that a called subscriber is busy, a source of break-in indicating signals for indicating to said called subscriber that a break-in connection has been made, a source of ringing current for ringing said called subscriber, and recall relay means for recalling said called subscriber, said first detector means having first normally open contact means interconnecting said lines, second normally closed contact means applying said busy signal to said one line, third normally open contact means applying said break-in indicating signals to said lines, fourth normally open contact means for energizing said recall relay means, and fifth normally open contact means for applying said ringing current to another of said lines, said second detector means having sixth normally closed contact means in series with said third contact means, and seventh normally closed contact means in series with said fourth contact means, said recall relay means having eighth normally open contact means in series with said fifth contact means.

2. An automatic private exchange comprising a plurality of subscribers' lines, a source of a break-in signal connected to at least one of said lines, a source of a conference signal connected to said one line, a source of a busy signal connected to said one line for indicating that a called subscriber is busy, a source of a break-in indicating signal for indicating to a called subscriber that a break-in connection has been made, a source of ringing current for ringing a called subscriber recall relay means for recalling a called subscriber, first detector means connected to said one line and being responsive to said break-in signal for establishing a connection with a busy called subscriber and indicating to said busy called subscriber that a break-in connection has been made, said first detector means having first contact means connected to interconnect said one line with at least another of said lines, contact means for interrupting said busy signal, third contact means for connecting said break-in indicating signal to said other line, fourth contact means for energizing said recall relay means, and fifth contact means for applying said ringing signals to said other line, second detector means connected to said one line and being responsive to said conference signal for interrupting said break-in indicating signal and deenergizing said recall relay means, said second detector means having sixth normally closed contact means in series with said third contact means, and seventh normally closed contact means in series with said fourth contact means, said relay means having eighth normally open contact means in series with said fifth contact means.

3. An automatic private exchange of the type having a plurality of subscribers' lines, breaking-in signal source means connected to at least one of said lines, a source of busy signals connected to said one line, a source of break-in indicating signals, a source of a ringing current, and first detector means connected to said one line and responsive to said breaking-in signal for establishing a connection between said one line and at least another line, interrupting said busy signal, and connecting said break-in indicating signal to said other line, and in which recall circuit means are provided for connecting said source of ringing current to said other line, said exchange comprising a source of a conference signal connected to said one line, and second detector means connected to said one line and being responsive to said conference signal, said second detector means comprising means for reducing the level of said break-in indicating signal, and means for interrupting said ringing current in response to detection thereby of a conference signal.

4. An automatic private exchange comprising a plurality of subscribers' lines, a connecting circuit for interconnecting said lines, a source of a break-in signal connected to at least one of said lines, and a source of a conference signal connected to said one line, said connecting circuit comprising:

a first detector responsive to said break-in signal,
a second detector responsive to said conference signal,
a source of busy signals,
a source of break-in indicating signals,
a source of ringing current, and
a recall relay,
said first detector comprising relay means having:
first normally open contacts for connecting circuit to a called subscriber's line, second normally closed contacts for applying said busy signal to a calling subscriber's line,
third normally open contacts for applying said break-in indicating signals to said called and calling subscribers' line,
fourth normally open contacts for energizing said recall relay, and
fifth normally open contacts for applying said ringing current to said called subscriber's line,
said second detector comprising relay means having:
sixth normally open contacts in series with said third contacts, and
seventh normally closed contacts in series with said fourth contacts.

References Cited in the file of this patent

UNITED STATES PATENTS

| | | |
|---|---|---|
| 1,956,610 | Belas et al. | May 1, 1934 |
| 2,513,964 | Pearce | July 11, 1950 |
| 2,578,071 | Jones et al. | Dec. 11, 1951 |
| 2,824,909 | Lomax | Feb. 25, 1958 |
| 2,880,276 | Pharis | Mar. 31, 1959 |

UNITED STATES PATENT OFFICE

CERTIFICATE OF CORRECTION

Patent No. 3,127,478 March 31, 1964

Johannes Martinus Brouwer

It is hereby certified that error appears in the above numbered patent requiring correction and that the said Letters Patent should read as corrected below.

Column 5, line 27, after "connecting" insert -- said connecting --.

Signed and sealed this 18th day of August 1964.

(SEAL)
Attest:

ERNEST W. SWIDER
Attesting Officer

EDWARD J. BRENNER
Commissioner of Patents